July 16, 1968

J. W. CABLE 3,393,257

NOVEL POLYMERIC CURING PROCESS

Filed Sept. 26, 1966

INVENTOR.
JOSEPH W. CABLE

INVENTOR.
JOSEPH W. CABLE

United States Patent Office 3,393,257
Patented July 16, 1968

3,393,257
NOVEL POLYMERIC CURING PROCESS
Joseph Wesley Cable, Monroe, Conn., assignor to Cabot Corporation, Boston, Mass., a corporation of Delaware
Continuation-in-part of application Ser. No. 494,273, Oct. 8, 1965. This application Sept. 26, 1966, Ser. No. 581,937
19 Claims. (Cl. 264—27)

ABSTRACT OF THE DISCLOSURE

The present invention relates to a novel method for curing polyolefinic compositions. The compositions of interest comprise: (a) a polyolefin, (b) an electrically conductive filler, and (c) a thermally activatable curing agent. The curing step is effected by electrical resistance heating of the composition to at least minimum activation temperature of the curing agent forming part thereof.

---

Figure 1:
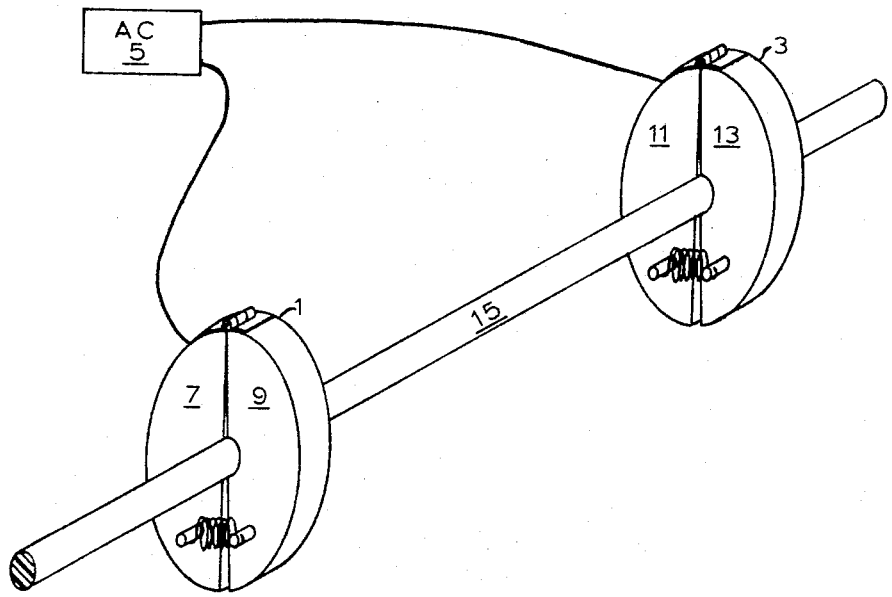

This application is a continuation-in-part of copending U.S. application Ser. No. 494,273, filed Oct. 8, 1965, now abandoned.

The use of articles comprising cured or "crosslinked" polymeric compositions has enjoyed a burgeoning growth and the fabrication of such articles is presently a widely practiced and well-known art. Said compositions are utilized widely in industry for wire coating, pipe, tubing, containers, molded articles and the like. In general, said articles are formed from a suitable curable polymeric composition containing a thermally activatable free radical producing curing agent. Said curable polymeric compositions are generally formed such as by extrusion or injection molding prior to curing and after the desired form has been achieved are cured or "crosslinked."

The curing step is generally accomplished by heating the curable composition to at least the minimum active decomposition temperature of the curing agent and usually substantially thereabove. Although any method by which said heating can be accomplished is satisfactory, such as by placing the composition in a heated zone or the like, a potentially more attractive curing method resides in heating the composition electrically. For instance, electrical heating of curable polymeric compositions has been accomplished by various dielectric or induction heating methods. However, each of these methods presents certain disadvantages. Foremost of these is the fact that both induction heating and dielectric heating of curable polymeric compositions is inherently uneconomical in that the equipment required is expensive and relatively complicated. Moreover, the voltages required for successful operations are relatively high giving rise to various problems inherently associated with the use of high voltage electrical energy, such as arcing, corona, etc.

It is a principal object of the present invention to provide a novel process for curing of certain polymeric compositions by resistance heating.

It is another object of the present invention to provide a method for unusually uniform curing of certain polymeric compositions.

Other objects and advantages of the present invention will in part be obvious and will in part appear hereinafter.

In accordance with the present invention, the above and other objects of the present invention are achieved when an electric current is flowed through certain curable polymeric compositions.

It has been suggested, for instance in U.S. Patent No. 2,324,644 to Powell et al. and in an article by Felix Yerzley in Rubber Age, Nov. 1942, pages 133–134, that heating of rubber compositions comprising rubbers such as neoprene, butadiene, natural latex and the like and an electrically conductive filler can be effected by passing an electric current through the composition. However, such processes are often deleteriously affected by an unfavorable temperature/resistance relationship of the rubber composition. Said relationship is characterized broadly by a neutral or negative thermal coefficient of resistivity, i.e. the resistivity of the composition normally decreases or remains static with an increase in the temperature thereof. Said relationship often results in uneven curing of the composition by conductive heating methods because current passing through the composition tends to follow the path of least resistance, i.e. the current flows preferentially through the more highly heated or more conductive portions of the composition. Clearly, unless stringent provisions are made to (1) selectively cool or (2) alter the resistance characteristics of said prior art compositions during the vulcanization step, the resulting composition may be unevenly vulcanized. The more highly heated or conductive portions will tend to be overcured or "scorched" while the relatively cooler or less conductive portions of the mass will tend to be incompletely cured. In accordance with the process of the present invention, however, the curing of certain polymeric compositions having a positive thermal coefficient of resistivity is achieved evenly and rapidly when an electric current is flowed therethrough.

Curable polymeric compositions suitable for use in the process of the present invention comprise in general: (1) an α-mono-olefinic polymer, (2) an electrically conductive filler, and (3) a thermally activatable curing agent.

Olefinic polymers suitable for use in the curable compositions of the present invention are in general any essentially uncured polymer of an α-mono-olefinic hydrocarbon and in particular polymers and copolymers such as polyethylene, chlorinated polyethylene, polypropylene, ethylene/propylene copolymers, ethylene/butene copolymers, ethylene/vinyl acetate copolymers and mixtures thereof.

It should be noted that the use of polymers of α-mono-olefinic hydrocarbons is critical in the practice of the present invention. Whereas, as has been explained hereinbefore, conductive rubber compositions comprising an electrically conductive filler frequently display a negative or neutral resistivity/temperature relationship, compositions comprising polymers of α-mono-olefinic hydrocarbons and electrically conductive fillers generally display a positive resistivity/temperature relationship, i.e. the resistivity of such compositions tends to rise with increasing temperature. This positive thermal coefficient of resistity is an all-important quality to the success of the present invention because it imparts to the composition the ability to be cured evenly by resistance heating. Thus, when a potential is applied to the compositions utilized in the practice of the present invention, the initial current flow will also tend to course through the path of least resistance, thereby heating said path. Thereafter, however, in direct contrast to those rubber compositions having a negative thermal coefficient of resistivity, the current will preferentially flow through the cooler portions of the composition thereby resulting in an unusually even cure.

Generally any finely-divided electrically conductive solid having an average particle size of less than about one micron can comprise the filler material. For instance, finely-divided powdered metals and metal alloys such as copper, iron, nickel, chrome/nickel, aluminum, iron/nickel and the like are suitable. Preferred, however, are carbon blacks such as thermal blacks, acetylene blacks, oil furnace blacks, gas furnace blacks, channel blacks, graphite and mixtures thereof. The amount of even the more electrically conductive fillers utilized in the curable polymeric composition can vary substantially depending upon the particular polymer utilized, the average particle size and morphology of the filler, the degree of dispersion of said filler, etc. It is important to bear in mind, however, that the amount of any particular filler utilized should result in a polymeric composition having a maximum specific resistivity of about 100,000 ohm-cms. at 20° C. and preferably having a maximum resistivity of about 10,000 ohm-cms. Generally, it will be found that when carbon black is utilized as the filler, between about 20 and about 500 parts of carbon black per hundred parts by weight of the total polymer content of the composition will be satisfactory. Carbon black loadings of between about 40 and about 120 parts per 100 parts of the total polymeric content are particularly advantageous. Loadings of electrically conductive fillers which result in polymeric compositions having a specific resistivity substantially greater than about 100,000 ohm-cms. at 20° C. are normally to be avoided, since at such high levels of resistance not only will the electric power require to cure the composition usually bt excessive but also arcing and surface breakdown can occur.

Thermally activatable curing agents suitable for use in the practice of the process generally include any thermally activatable free-radical producing crosslinking agent known to the art such as quinone oximes, organonitriles and organic peroxides. Organic peroxides are, however, especially preferred. Specific examples of suitable organic peroxides are: benzoyl peroxide, dicumyl peroxide, di-t-butyl peroxide, decanoyl peroxide, caprylyl peroxide, t-butyl-cumyl peroxide and many of the peroxides presently known to the art, for instance, the peroxides disclosed in U.S. Patents Nos. 2,888,424 and 2,623,214 and in the trade bulletin Evaluation of Organic Peroxides From Half-Life Data, II, page 10, O. Mageli, S. Bukata and D. Bolton, Lucidol Division, Wallace and Tiernan, Inc., Buffalo, N.Y.

It should be noted that the organic peroxide can be incorporated into the polymeric composition prior to or after forming thereof. For instance, the peroxide can be incorporated into the composition, such as by milling prior to thermoforming, provided of course, that the active decomposition temperature of the peroxide is greater (preferably at least about 20° C.) than the temperatures to which said composition is exposed during the incorporation of the curing agent and prior to curing.

It should be noted and understood that curing agents often decompose to some extent before the active decomposition temperature thereof is attained. However, the extent of said premature decomposition, such as can occur during thermoforming operations, is generally of a minor nature and does not normally result in substantial curing of the composition. Thus, for the purposes of the present disclosure and claims, curable polymeric compositions undergoing such partial curing prior to the intended curing step are "essentially uncured."

It is also possible, particularly when carbon black is the filler, to incorporate the peroxide by treating the formed article with a liquid organic peroxide as is taught in copending U.S. application Ser. No. 366,142 to R. Z. Naar, filed May 8, 1964. When the organic peroxide is incorporated in this manner, it will normally be preferred to utilize peroxides having active decomposition temperatures at least somewhat below the softening temperature of the final curable composition in order that substantial deformation of the article be avoided during curing operations.

The amount of curing agent present in the composition will vary depending upon such parameters as the particular curing agent and polyolefin utilized, the type and loading of the conductive and any other fillers, the desired end use of the final cured article, etc. Generally, however, it will be found that when an organic peroxide is the curing agent, a content thereof representing between about 0.25% and about 20.0% by weight of the α-mono-olefinic hydrocarbon polymer content of the composition will be sufficient. Generally preferred, however, are compositions comprising about between 0.5 and about 5% by weight of the α-mono-olefinic polymeric content of the organic-peroxide.

Fabrication of the polymeric composition to produce the shaped article desired can be accomplished in any suitable manner. Examples of techniques well known to the art and which are entirely suitable in the practice of the present invention are: extrusion, blowmolding, compression molding, injection molding, powder molding, vacuum forming, solution casting and the like. It should be noted that in conjunction with the following discussion of the curing step it is normally economically advantageous and practical to cure the composition while the temperature thereof is still relatively elevated. In this manner, the additional heating required in the curing step will obviously be minimized.

The types of electrical current utilized to effect curing is generally not critical. For instance, alternating current, direct current, pulsating direct current and the like can be utilized. Due to considerations of general availability and the economics normally realized in terms of equipment, it will normally be advantageous to utilize alternating current having a frequency of between about five cycles and about 1,000 cycles per second. However, it should be noted that alternating current having an average frequency of between about 25 and about 65 cycles per second is usually readily available and is generally entirely suitable.

Obviously, the voltage required to effect curing will vary greatly depending, to a large extent, upon the resistivity of the composition, the temperature at which active decomposition of the curing agent takes place, the resistivity of the circuitry (electrodes, wires, power source etc.), the volume of composition through which the current passes, etc. Therefore, the voltage required to heat any particular composition to at least the active decomposition temperature of the particular curing agent can best be determined bearing the above considerations in mind. Said requirements are well understood by those skilled in the art and need no further discussion here.

In effecting cure of a polymeric composition utilizing electric current of the type described hereinabove, it is important that the means utilized to apply the potential to the composition, i.e. the electrodes, provide a good electrical contact with said composition. If said precaution is not taken, arcing can occur. Consequently, the surfaces of the composition and the electrodes should be maintained in good electrical contact during the curing step.

A better understanding of the invention can be obtained from the following examples which, however, should be construed as being illustrative in nature and as not limiting the scope of the present invention.

Figure 2:
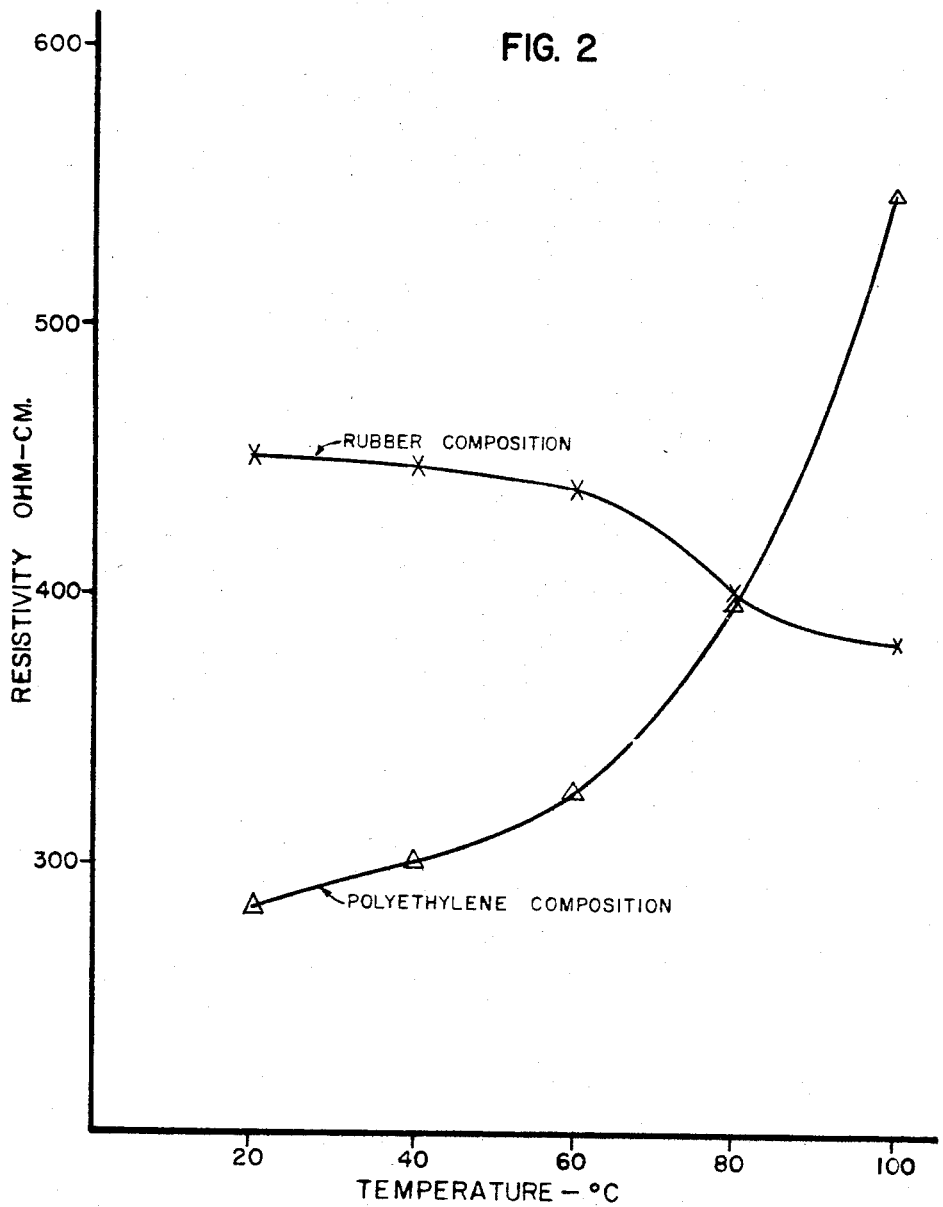

In the following examples further reference is made to the drawings forming part hereof wherein:

FIGURE 1 is an isometric diagrammatic view of electrode apparatus disposed about a formed, elongate polymeric composition during curing operations, and FIGURE 2 is a graph representing the thermal coefficients of resistivity of a typical conductive rubber composition and a conductive polymeric composition suitable for use in practice of the present invention.

Example 1

A curable polymeric composition comprising about 100 parts of high density (0.960 gm./cc.) polyethylene, about 50 parts of a channel black and about 4 parts of 2,5-dimethyl-2,5-di(butyl peroxy) hexyne-3 is continuously extruded at a melt temperature at the die face of about 125–135° C. and there is produced cord of about one inch diameter. About 200 feet of said cord is produced and is cooled to about 20° C. A sample disk of about ⅛ inch thickness is tested for solubility in boiling xylene at standard pressure and the polyethylene content thereof is found to be about 95 weight percent soluble. The resistivity of the composition is tested as a function of temperature as follows: A sample disk of the cord of about ⅛ inch thickness is painted on the exposed parallel flat surfaces thereof with a colloidal silver conductive paint. The prepared sample is placed in circuit with an Ohmmeter and the sample is placed into a nitrogen flushed oven. The oven is then heated to about 100° C. in 20° C. increments, each of said increments being maintained for about 30 minutes. The resulting resistivities are plotted as a function of temperature in FIGURE 2, "polyethylene composition." One hundred feet of cord 15 while at an initial temperature of about 20° C. is then passed through a ring electrode assembly of the type shown in FIGURE 1 at a rate of about 2 feet/minute. Said assembly comprises two split ring electrode assemblies 1 and 3 in electrical communication with A.C. power source 5. Electrode assemblies 1 and 3 are spaced about 4 inches apart, the semicircular rings 7, 9, 11 and 13 of each electrode being biased toward their mates in order to maintain contact with the surface of cord 15. After start up, a potential of about 75 volts and about 60 cycles per second is applied to the electrodes. The temperature of the cord between the electrodes is measured by use of an infrared detection device and is determined to be about 200° C. After cooling, five sample disks each of about ⅛ inch thickness are taken at about 20 foot intervals along the 100 feet length of cord. The disks are separately weighed and placed into separate 500 milliliter jars equipped with refluxing condensers. There is additionally charged into each of said jars about 200 milliliters of xylene and the contents of four of the jars are refluxed at the boiling point of xylene (138–141° C.) for about 15 minutes while the contents of the remaining jar are refluxed under substantially the same conditions for about 2 hours. The disks refluxed for 15 minutes are then removed and examined and it is found that said disks are relatively uniformly pitted, thereby indicating that uniform curing of the composition has taken place. The solid contents of the system refluxed for 2 hours is dried in a vacuum oven for about 24 hours at about 66° C. and weighed and it is found that about 15% of the polymeric content thereof has been dissolved by the refluxing xylene, indicating that substantial curing of the composition has been effected.

Example 2

This example is essentially a duplicate of Example 1 with the exception that there is utilized in place of the polyethylene composition a natural rubber composition and the processing steps are accordingly modified to the extent that said composition be formed and vulcanized. The composition of this example comprises:

| | Parts |
|---|---|
| Smoked sheets | 100 |
| Channel black | 50 |
| Stearic acid | 3 |
| Sulfur | 2.5 |
| N-cyclohexyl-2-benzothiazole sulfenamide | 1.0 |
| Pine tar | 3.0 |

Said composition is continuously extruded at a melt temperature of about 100° C. After cooling to about 20° C., samples of the resulting cord are tested for resistivity as a function of temperature (FIGURE 2—"Rubber Composition") and solubility in boiling xylene. The polymeric content of the composition is found to be about 95 weight percent soluble in the boiling xylene. About 100 feet of the cord is passed through electrode assemblies 1 and 3 at a rate of about 2 feet/minute and a potential of about 75 volts and about 60 cycles per second is applied. The temperature of the extruded rubber cord between the electrodes is measured and found to be about 205° C.

After cooling of the extruded and vulcanized cord product, disk samples thereof are tested in boiling xylene as described in Example 1. It is found that various portions of the disks have pitted to varying degrees thereby indicating that the vulcanization has taken place unevenly. It is further found that about 30% of the elastomer content of the vulcanizate is soluble in the refluxing xylene.

About 100 feet of the remaining unvulcanized extruded composition is conducted through a 20 foot steam tube vulcanizer heated to about 150° C. at the rate of about one foot/minute. Disk samples of the vulcanized product are tested in boiling xylene and it is found that the disks are evenly pitted. About 30% of the elastomeric content of the composition is soluble in the refluxing xylene.

Obviously, many changes can be made in the above description and examples without departing from the scope of the present invention.

For example, the polymeric composition to be cured in accordance with the present invention can comprise, in addition to the polymer of an α-mono-olefin hydrocarbon the conductive filler, and the curing agent, any of the other additives normally added to such compositions. Thus, various pigments and antioxidants as well as other fillers or polymers can be incorporated into said compositions provided of course that the resulting composition has a positive thermal coefficient of resistivity.

In addition, conductive fillers other than carbon black can be utilized in accordance with the present invention. However, carbon blacks such as channel blacks and furnace blacks have been found to be excellent conductive fillers, and moreover are known to contribute substantially to the properties of the resulting cured composition therefore, they are usually much preferred.

What is claimed is:

1. A process for producing cured polymeric compositions which comprises heating a curable polymeric composition having a positive thermal coefficient of resistivity comprising (a) an essentially uncured polymer of an α-mono-olefinic hydrocarbon (b) a thermally activatable curing agent, and (c) an electrically conductive filler in an amount sufficient to impart a specific resistivity to said curable composition of less than about 100,000 ohm-cms. at 20° C., by flowing through said composition a current of sufficient voltage and having a frequency of from 0 to about 1,000 cycles per second and to heat said composition to at least the minimum active decomposition temperature of said curing agent.

2. The process of claim 1 wherein the current utilized is alternating current.

3. The process of claim 2 wherein the average frequency of said alternating current is between about 25 and about 65 cycles/second.

4. The process of claim 1 wherein said polymer is polyethylene.

5. The process of claim 1 wherein said electrically conductive filler is carbon black.

6. The process of claim 5 wherein said carbon black is chosen from the group consisting of acetylene black, conductive furnace black, graphite and mixtures thereof.

7. The process of claim 5 wherein the amount of carbon black utilized represents between about 40 and about 120 parts per one hundred parts by weight of the total polymeric content of the composition.

8. The process of claim 1 wherein said thermally activatable curing agent is an organic peroxide.

9. The process of claim 8 wherein the amount of said organic peroxide curing agent utilized represents between about 0.05 and about 5% by weight of the α-mono-olefinic hydrocarbon polymer content of the composition.

10. The process of claim 1 wherein the specific resistivity of said curable composition at 20° C. is less than about 10,000 ohm-cms.

11. A process for producing cured polymeric articles which comprises: (a) thermoforming a polymeric composition having a positive thermal coefficient of resistivity comprising (1) an essentially uncured polymer of an α-mono-olefinic hydrocarbon, (2) a thermally activatable curing agent, an (3) an electrically conductive filler in an amount sufficient to impart a specific resistivity to said composition of less than about 100,000 ohm-cms. at 20° C, and (b) resistance heating the resulting formed article by flowing therethrough a current having a frequency of between 0 and about 1,000 cycles per second and of sufficient voltage to heat said article to at least the minimum active decomposition temperature of said curing agent.

12. The process of claim 11 wherein step (b) is effected subtantially immediately following step (a).

13. The process of claim 11 wherein said thermoforming step is extrusion.

14. The process of claim 11 wherein the minimum active decomposition temperature of said curing agent is at least about 20° C. higher than the minimum softening temperature of the curable composition.

15. The process of claim 11 wherein said electrically conductive filler is carbon black.

16. The process of claim 11 wherein the current utilized is alternating current.

17. A process for producing cured polymeric articles which comprises:
 (a) thermoforming a composition having a positive thermal coefficient of resistivity comprising (1) an essentially uncured polymer of an α-mono-olefinic hydrocarbon, (2) a thermally activatable curing agent, and (3) an electrically conductive filler in an amount sufficient to impart a specific resistivity to said composition of less than about 100,000 ohm-cms. at 20° C;
 (b) treating the resulting article with a liquid organic peroxide; and
 (c) resistance heating the treated article by applying a potential thereto having a frequency of between 0 and about 1,000 cycles per second and of sufficient voltage to heat said article to at least the minimum active decomposition temperature of said organic peroxide.

18. The process of claim 17 wherein the minimum active decomposition temperature of said organic peroxide is lower than the minimum flow temperature of the formed composition.

19. The process of claim 17 wherein said electrically conductive filler is carbon black.

References Cited
UNITED STATES PATENTS

| | | |
|---|---|---|
| 3,054,142 | 9/1962 | Hinderer. |
| 2,972,780 | 2/1961 | Boonstra. |
| 2,509,652 | 5/1950 | Rushmer _____ 264—27 |
| 2,953,869 | 9/1960 | Holoubek _____ 264—27 |

OTHER REFERENCES

"Vulcanization or Other Heat Treatment by Electrical Conduction," Rubber Age, November 1942, pages 133 and 134 relied upon.

ROBERT F. WHITE, *Primary Examiner.*

R. B. MOFFITT, J. H. SILBAUGH, *Assistant Examiners.*